United States Patent
Chen (10) Patent No.: US 7,929,532 B2
(45) Date of Patent: Apr. 19, 2011

(54) SELECTIVE MULTICAST TRAFFIC SHAPING

(75) Inventor: Charles Chen, Santa Rosa, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 1313 days.

(21) Appl. No.: 11/164,647

(22) Filed: Nov. 30, 2005

(65) Prior Publication Data

US 2007/0121627 A1    May 31, 2007

(51) Int. Cl.
*H04L 12/28* (2006.01)
*H04L 12/56* (2006.01)
*G06F 15/173* (2006.01)

(52) U.S. Cl. .......................... 370/390; 370/392; 709/240

(58) Field of Classification Search .................. 370/236, 370/432, 389, 390, 392, 395.3; 709/240, 709/238
See application file for complete search history.

(56) References Cited

U.S. PATENT DOCUMENTS

| | | | | |
|---|---|---|---|---|
| 5,831,971 A * | 11/1998 | Bonomi et al. | | 370/230 |
| 6,542,469 B1* | 4/2003 | Kelley et al. | | 370/238 |
| 6,633,575 B1* | 10/2003 | Koodli | | 370/412 |
| 6,967,949 B2* | 11/2005 | Davis et al. | | 370/390 |
| 7,088,710 B1* | 8/2006 | Johnson et al. | | 370/357 |
| 2001/0025310 A1* | 9/2001 | Krishnamurthy et al. | | 709/223 |
| 2002/0036984 A1* | 3/2002 | Chiussi et al. | | 370/232 |
| 2002/0039349 A1* | 4/2002 | Malaney et al. | | 370/230.1 |
| 2002/0075802 A1* | 6/2002 | Sugama et al. | | 370/230.1 |
| 2002/0095498 A1* | 7/2002 | Chanda et al. | | 709/225 |
| 2003/0031141 A1* | 2/2003 | Schweinhart et al. | | 370/316 |
| 2003/0099198 A1* | 5/2003 | Kiremidjian et al. | | 370/230.1 |
| 2003/0142681 A1* | 7/2003 | Chen et al. | | 370/401 |
| 2003/0174690 A1* | 9/2003 | Benveniste | | 370/350 |
| 2003/0189930 A1* | 10/2003 | Terrell et al. | | 370/389 |
| 2003/0189942 A1* | 10/2003 | Sawey | | 370/412 |
| 2004/0064582 A1* | 4/2004 | Raghunath et al. | | 709/240 |
| 2004/0177087 A1* | 9/2004 | Wu et al. | | 707/102 |
| 2005/0100036 A1* | 5/2005 | Davis | | 370/432 |
| 2005/0220129 A1* | 10/2005 | Boyd | | 370/428 |
| 2006/0013139 A1* | 1/2006 | Koch et al. | | 370/236 |
| 2006/0165029 A1* | 7/2006 | Melpignano et al. | | 370/328 |
| 2006/0203728 A1* | 9/2006 | Kwan et al. | | 370/235 |
| 2007/0005782 A1* | 1/2007 | Zheng | | 709/230 |
| 2007/0041384 A1* | 2/2007 | Das et al. | | 370/395.4 |
| 2007/0058629 A1* | 3/2007 | Luft | | 370/390 |
| 2007/0058632 A1* | 3/2007 | Back et al. | | 370/392 |
| 2007/0121627 A1* | 5/2007 | Chen | | 370/390 |
| 2009/0257751 A1* | 10/2009 | Sadananda et al. | | 398/83 |
| 2010/0020685 A1* | 1/2010 | Short et al. | | 370/230 |

* cited by examiner

*Primary Examiner* — Jayanti K Patel
*Assistant Examiner* — Christopher T Wyllie (57) ABSTRACT

A method and integrated hardware system for multicast transmission shaping in EPONs which employs a selective multicast algorithm that significantly reduces the complexity of traffic shaping for multicast traffic. Unlike prior art methods, my method exploits the broadcasting nature of the downstream point-to-multipoint access system including EPONs. Operationally, the method transforms a multicast traffic shaping problem into a unicast traffic shaping problem by selecting a multicast subscriber and subsequently treating packets addressed to that selected multicast subscriber as unicast. Advantageously, these packets are still available to other members of the multicast group. And since these packets are treated as unicast from the perspective of traffic shaping, my inventive method significantly reduces traffic shaping complexity in multicast environment.

12 Claims, 6 Drawing Sheets

SELECTIVE MULTICAST TRAFFIC SHAPING

FIELD OF THE INVENTION

This invention relates generally to the field of packet-switched networks. More particularly, it relates to a method of Multicast Traffic Shaping for a Passive Optical Network (PON) and likewise to any point-to-multipoint access network.

BACKGROUND OF THE INVENTION

The communications industry is on the cusp of a revolution characterized by three driving forces that will forever change the communications landscape. First, deregulation has opened the local loop to competition, launching a whole new class of carriers that are spending billions to build out their networks and develop innovative new services. Second, the rapid decline in the cost of fiber optics and Ethernet equipment has made them an attractive option for access loop deployment. Third, the Internet has precipitated robust demand for broadband services, leading to an explosive growth in Internet Protocol (IP) data traffic while, at the same time, putting enormous pressure on carriers to upgrade their existing networks.

These drivers are, in turn, promoting several key market trends. In particular, the deployment of fiber optics is extending from the telecommunications backbone to Wide-Area Network(s) (WAN) and Metropolitan-Area Network(s) (MAN) and the local-loop. Concurrently, Ethernet is expanding its pervasiveness from Local-Area Network(s) to the MAN and the WAN as an uncontested standard.

The confluence of these factors is leading to a fundamental paradigm shift in the communications industry, a shift that will ultimately lead to widespread adoption of a new optical IP Ethernet architecture that combines the best of fiber optic and Ethernet technologies. This architecture is poised to become the dominant means of delivering bundled data, video, and voice services on a single platform.

Passive Optical Networks (PONs) address the "last mile" of communications infrastructure between a Service Provider's Central Office (CO), Head End (HE), or Point of Presence (POP) and business or residential customer locations. Also known as the "access network" or "local loop", this last mile consists predominantly—in residential areas—of copper telephone wires or coaxial cable television (CATV) cables. In metropolitan areas—where there is a high concentration of business customers—the access network often includes high-capacity synchronous optical network (SONET) rings, optical T3 lines, and copper-based T1 lines.

Historically, only large enterprises can afford to pay the substantial costs associated with leasing T3 (45 Mbps) or optical carrier (OC)-3 (155 Mbps) connections. And while digital subscriber line (DSL) and coaxial cable television (CATV) technologies offer a more affordable interim solution for data, they are infirmed by their relatively limited bandwidth and reliability.

Yet even as access network improvements have remained at a relative bandwidth standstill, bandwidth has been increasing dramatically on long haul networks through the use of wavelength division multiplexing (WDM) and other technologies. Additionally, WDM technologies have penetrated metropolitan-area networks, thereby boosting their capacities dramatically. At the same time, enterprise local-area networks have moved from 10 Mbps to 100 Mbps, and soon many will utilize gigabit (1000 Mbps) Ethernet technologies. The end result is a gulf between the capacity of metro networks on one side, and end-user needs and networks on the other, with a last-mile "bottleneck" in between. Passive optical networks—and in particular EPONs—promise to break this last-mile bottleneck.

The economics of EPONs are compelling. Optical fiber is the most effective medium for transporting data, video, and voice traffic, and it offers a virtual unlimited bandwidth. But the cost of deploying fiber in a "point-to-point" arrangement from every customer location to a CO, installing active components at each endpoint, and managing the fiber connections within the CO is prohibitive. EPONs address these shortcomings of point-to-point fiber solutions by using a point-to-multipoint topology instead of point-to-point; eliminating active electronic components such as regenerators, amplifiers, and lasers from the outside plant; and by reducing the number of lasers needed at the CO.

Unlike point-to-point fiber-optic technology, which is typically optimized for metro and long haul applications, EPONs are designed to address the demands of the access network. And because they are simpler, more efficient, and less costly than alternative access solutions, EPONS finally make it cost effective for service providers to extend optical fiber into the last mile.

Accordingly, EPONs are being widely recognized as the access technology of choice for next-generation, high speed, low cost access network architectures. EPONs exhibit a shared, single fiber, point-to-multipoint passive optical topology while employing gigabit Ethernet protocol(s) to deliver up to 1 Gbps of packetized services that are well suited to carry voice, video and data traffic between a customer premises and a CO. Adding to its attractiveness, EPONs have been recently ratified by the Institute of Electrical and Electronics Engineers (IEEE) Ethernet-in-the-First Mile (EFM) task force in the IEEE 802.3ah specification.

Figure 1:
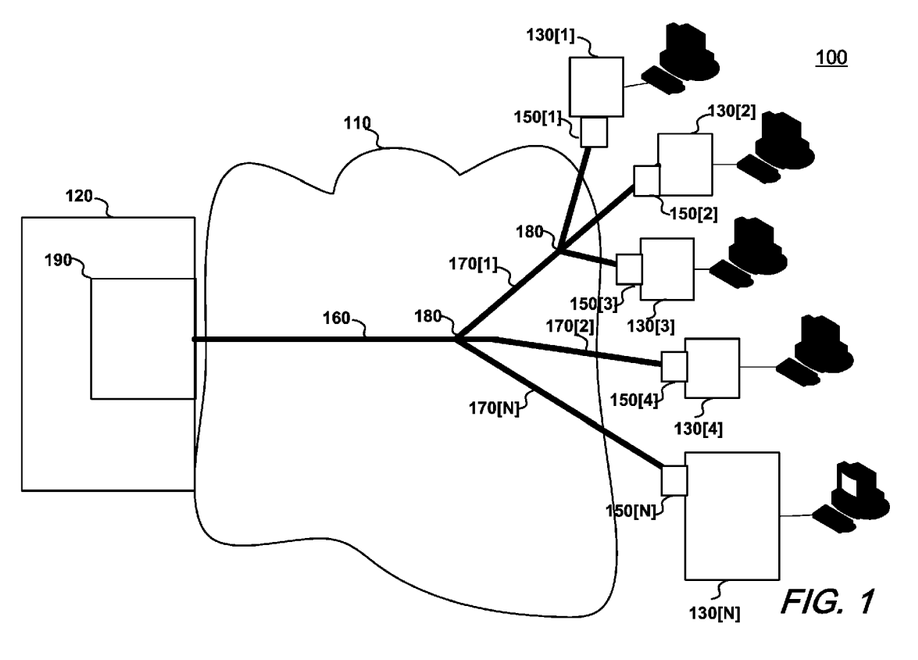
FIG. 1 is a block diagram of a representative Ethernet Passive Optical Network showing both customer premises and central office aspects.

With reference to FIG. 1, there is shown a typical EPON as part of overall network architecture 100. In particular, an EPON 110 is shown implemented as a "tree" topology between a service provider's CO 120 and customer premises 130[1] . . . 130[N], where a single trunk or "feeder" fiber 160 is split into a number of "distribution" fibers 170[1] . . . 170[N] through the effect of 1×N passive optical splitters/combiner 180.

As can be further observed with reference to this FIG. 1, the trunk fiber 160 is terminated at the CO 120 at Optical Line Terminator (OLT) device 190 and split into the number of distribution fibers 170[1] . . . 170[N] which are each either further split or terminated at an Optical Network Unit (ONU) 150[1] . . . 150[N] located at a respective customer premises 130[1] . . . 130[N].

Due to the directional properties of the optical splitter/combiner 180, the OLT 190 is able to broadcast data to all ONUs in the downstream direction. In the upstream direction, however, ONUs cannot communicate directly with one another. Instead, each ONU is able to send data only to the OLT. Thus, in the downstream direction an EPON may be viewed as a point-to-multipoint network and in the upstream direction, an EPON may be viewed as a multipoint-to-point network. In the downstream direction, the OLT functions as a transmitter and is the "point" of the point-to-multipoint network. Also in the downstream direction, the ONUs function as receivers and are the "multipoint" of the point-to-multipoint network. The ONU 150[1] . . . 150[N] is considered a multicast group. In a point-to-multipoint communications network comprising a transmitter and a plurality of receivers, wherein a single copy of a multicast message is delivered to one or more intended receivers, each receiver having associated with it an independent, pre-determined traffic profile, a method of shaping and scheduling multicast traffic at the transmitter prior to transmission to the intended receivers, said method comprising receiving, by the transmitter, a multicast packet for transmission to the intended receivers; and transmitting, the multicast packet to all of the intended receivers according to a particular one of the pre-determined traffic profile(s); said method characterized in that the traffic profile used for the multicast packet transmission is associated with only one of the one or more intended receivers.

Since multiple subscribers share the same fiber bandwidth, it is important to control and regulate the resources assigned to different services running over the shared EPON infrastructure. On some service provider networks, as few as 5% of the users have been found to consume up to 80% of the available bandwidth; on some enterprise networks, recreational activities consume up to 40% of bandwidth. The role of traffic management in these networks is essential because it enables network managers to block, limit, or guarantee bandwidth resources so that the network can support the primary business goals.

Each subscriber subscribes to the service offered by the service provider, based on the so-called service level agreement (SLA). Among other policy terms and conditions, the SLA contains the quality of service (QoS) requirements for bandwidth and delay, which is referred to as a traffic profile. The bandwidth information includes committed information rate (CIR), peek information rate (PIR), and burst size (BS). The delay information includes bounded delay and jitter. The traffic profile is used for the purpose of bandwidth allocation among subscribers in the upstream direction of the EPON system. The objective of the bandwidth allocation is to ensure that subscribers will gain fair access to the available bandwidth based on their respective traffic profiles.

The traffic profile is also used for the purpose of traffic shaping in the downstream direction of the EPON system. Generally speaking, traffic shaping is the process of delaying packets within a traffic stream to cause it to conform to some defined traffic profile. A shaper delays some or all of the packets in a traffic stream in order to bring the stream into compliance with a particular traffic profile. When implemented, a shaper usually has a finite-size buffer, and packets may be discarded if there is not sufficient buffer space to hold the delayed packets.

Reasons for the use of traffic shaping in the downstream direction at the OLT include: 1) to control access to available bandwidth; 2) to ensure that traffic to each ONU conforms to the traffic profile established for it, and 3) to regulate the flow of traffic in order to avoid congestion at the ONU that can occur when the transmitted traffic exceeds the access speed of the outgoing interface at the ONU.

Equally important, there are a number of practical considerations driving the implementation of traffic shaping in the downstream direction at the OLT. First, the packet memory at each ONU tends to be scarce, as the overall PON system cost limit its size. In addition, it is much more effective and efficient to add packet memory at the OLT since the memory can be shared by all ONUs in a dynamic manner. Adding individual memory to each ONU is not cost-effective from the standpoint of overall system cost. Second, downstream traffic is transmitted at a speed approaching 1 Gbps, while an ONU is typically connected to a physical subscriber link of only 100 Mbps. This order of magnitude difference could easily lead to packet loss if there were no traffic control in the downstream direction. Finally, traffic shaping has a positive impact on the bandwidth sharing of multiple subscribes in the downstream direction.

Unfortunately, traffic shaping of broadcast or multicast traffic in the downstream direction introduces a number of implementation issues. First, and in sharp contrast to unicast traffic, a multicast packet is sent to a number of subscribers. As a result, it is conditioned by more than one traffic shaper— generally one for each of the participating subscribers. Since this conditioning is made for each transmitted packet and requires that a comparison be made with every traffic shaper/ traffic profile, it is extremely time-consuming. Unfortunately, such comparison(s) becomes unworkable as the number of subscribers to a multicast stream becomes large.

Similarly problematic for a multicast packet is the situation where one subscriber's traffic shaper may disagree or otherwise conflict with another subscriber's traffic shaper. Since only one packet is sent downstream at a time, decisions affecting multicast packet transmission or delay must be made. To ensure system integrity, such decisions must be made in a consistent manner.

SUMMARY OF THE INVENTION

In recognition of these needs and deficiencies in the Art, I have developed method(s) for the downstream traffic shaping of multicast traffic in an EPON network. My method(s) advantageously employ a selective multicast algorithm which significantly reduces the complexity of traffic shaping for multicast traffic. Unlike prior art methods, my method exploits the broadcasting nature of the downstream EPON system.

Viewed from one aspect, my inventive method transforms a multicast traffic shaping problem into a unicast traffic shaping problem. Operationally, my method selects a multicast subscriber and subsequently treats packets addressed to that selected multicast subscriber as unicast. Advantageously, these packets are still available to other members of the multicast group. And since these packets are treated as unicast from the perspective of traffic shaping, my inventive method significantly reduces traffic shaping complexity in multicast environments.

Further features and advantages of our invention will become apparent with reference to the accompanying drawing and illustrative detailed description.

DETAILED DESCRIPTION

As can be readily appreciated, the downstream direction in an EPON system behaves like a single-broadcast channel (SBC), where each packet transmitted by an OLT will be received by all ONUs. This behavior is characteristic of an EPON whether a particular packet is multicast or unicast.

Accordingly, an ONU must filter those packets that are not intended for a subscriber associated with it.

For unicast traffic, mechanisms are known that permit an ONU to determine if a particular packet is destined for that ONU or not. For multicast traffic, snooping can be used to determine if a subscriber behind an ONU has subscribed to the multicast service or not.

Figure 2A:
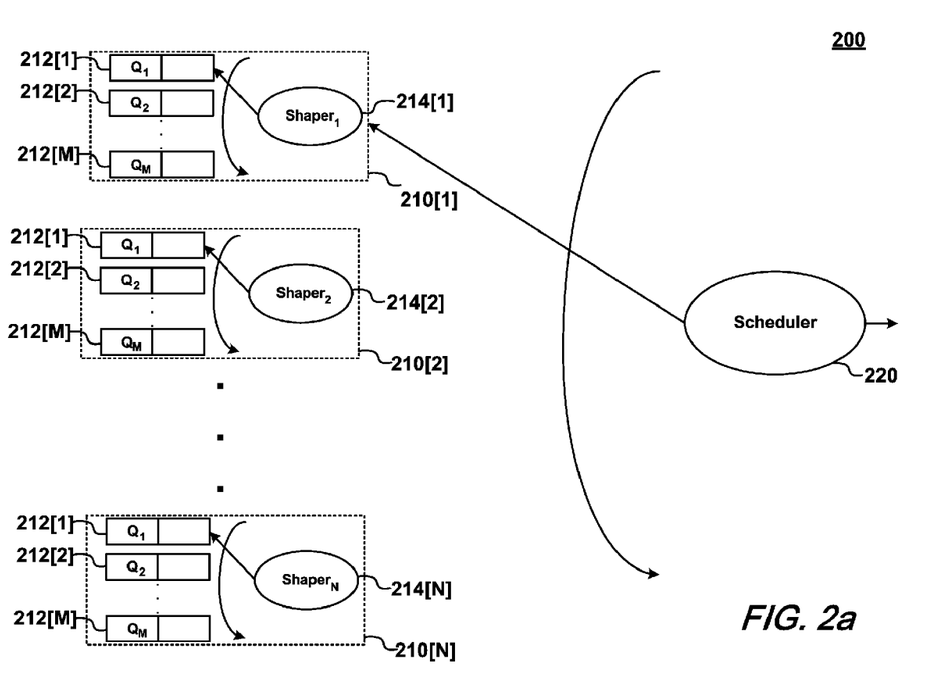
FIG. 2*a* is a schematic block diagram of a representative implementation of a number of queues associated with ONUs at the OLT.

With reference now to FIG. 2a, there is shown a diagram depicting an implementation of my inventive method. As shown in that FIG. 2a and characteristic of a representative deployment, there exists a number of ONUs 210[1] . . . 210[N], each having a set of priority queues 212[1] . . . 212[N], each one of the queues typically being associated with a particular service offering e.g., video, audio and/or data. Any data packets or multicast packets received by the OLT and destined for a particular ONU contain a header which in turn identifies which one of the priority queues 210[1] . . . 210[N] should be used for buffering that particular data packet.

Each one of the ONUs 210[[1] . . . 210[N] has a shaper 214[1] . . . 214[N] associated with it. The function of the shaper(s) 214[1] . . . 214[N] is to maintain a defined traffic profile of the particular ONU containing the shaper.

While not specifically shown in this FIG. 2a, each one of ONUs 210[1] . . . 210[N] includes a scheduler to service the ONUs service priority queues 212[1] . . . 212[N]. As can be appreciated, a scheduler is required within each of the ONUs 210[1] . . . 210[N] because each subscriber serviced by a particular ONU has—associated with that subscriber—a single aggregate profile. If, such a subscriber had a separate traffic profile for each traffic priority, then a scheduler would not be required.

Advantageously, a number of particular scheduling policies may be employed by a particular ONU scheduler. More particularly, a scheduling policy may employ a weighted round-robin and/or weighted fair queuing mechanisms. Additionally, a downstream scheduler 220, shown in FIG. 2a provides a scheduling service for all ONUs 210[1] . . . 210[N], thereby ensuring fair access to downstream bandwidth among the ONUs 210[1] . . . 210[N].

Figure 2B:
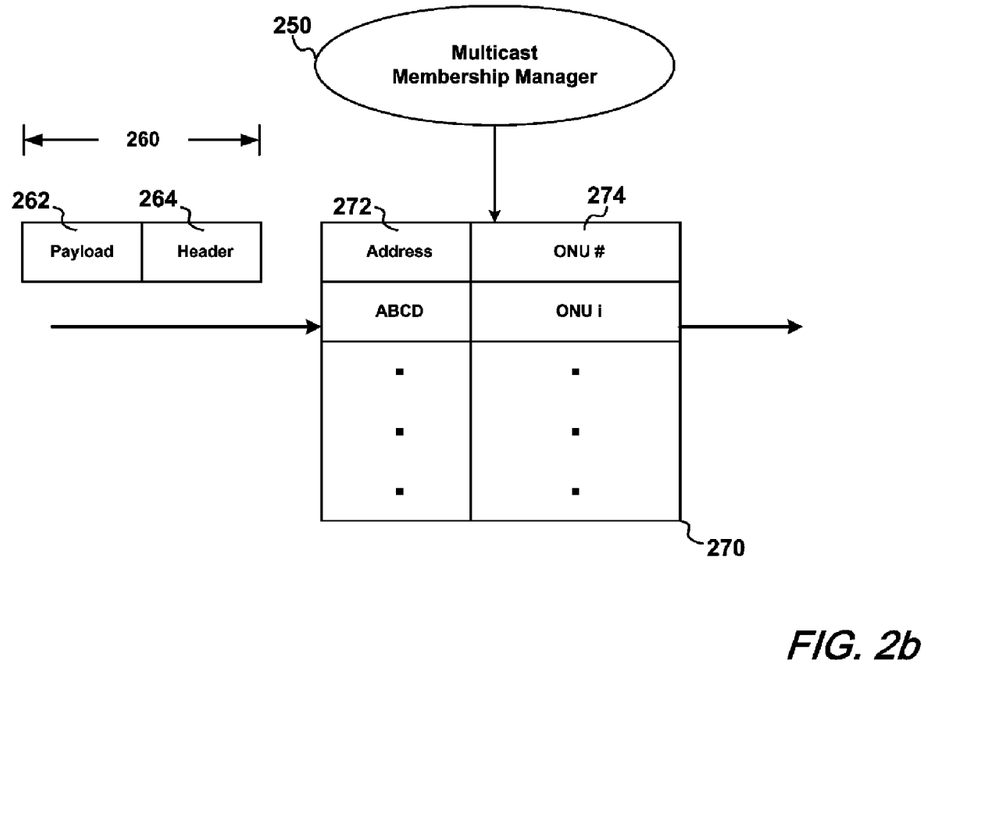
FIG. 2*b* is a block diagram depicting a multicast membership manager and associated data structures.

With reference to FIG. 2b, multicast membership manager (MMM) 250, preferably implemented in software, performs a number of functions. First, it maintains multicast membership information and in particular which address(es) are multicast addresses. For each multicast address, the MMM 250 tracks which particular ONUs has subscribed to a multicast service identified by the multicast address. Advantageously, this tracking may be performed using known methods such as IGMP snooping.

Additionally, the MMM 250 selectively determines which ONU has assigned to it particular multicast address(es) so that multicast packets belonging to those particular multicast addresses are queued within the assigned ONU. Finally—and based upon multicast membership information and selection—MMM 250 updates a multicast filtering table 270, which may advantageously be implemented in hardware. As shown in FIG. 2b, the multicast filtering table 270 may be indexed by multicast address contained within a header 264 of an incoming multicast packet 260, thereby providing an ONU identifier 274 indicative of a particular ONU to which the multicast packet 260 is assigned.

With these principles in place, there remain two additional considerations that merit discussion. The first pertains to the particular method used to make a selection of ONU for a given multicast, while the second pertains to the dynamic nature of multicast membership.

Selective Multicast Algorithm(s)

In operation, a selective multicast algorithm determines which subscriber (or multicast member) among the members of a multicast group is chosen to have its traffic shaped. By way of example, consider a given multicast service group having N members (ONUs-$ONU_1 \ldots ONU_N$). For a particular ONU, $ONU_i$, say, assiume that it has a traffic profile $P_i$. As is understood, this traffic profile $P_i$ comprises a set of typical parameters including (Committed Information Rate) $CIR_i$, (Peak Information Rate) $PIR_i$ and (Broadcast Service) $BS_i$. The objective of a selective multicast algorithm then, is to select $ONU_x$ ($1 \leq x \leq N$) as a target shaper for the multicast service, where $ONU_x$ is called the assignee for the multicast group under consideration. Lastly, and as used herein, the notation $$ONU_x \cap f\{P_1, P_2, \ldots, P_N\}$$

means that $ONU_x$ profile satisfies the function f among all the traffic profiles.

Max-Profile Algorithm

When the Max-Profile Algorithm is employed, a selection decision is based on the maximum profile among those traffic profiles that belong to a given multicast group. Generally, it is generally expressed as:

$$ONU_x \cap \max\{P_1, P_2, \ldots, P_N\};$$

where max is is a function that finds the maximum value among its elements. Advantageously, this relationship may be further simplified to:

$$ONU_x \cap \max\{PIR_1, PIR_2, \ldots, PIR_N\};$$

where the ONU having the maximum PIR value is selected as assignee.

In operation, the max-profile algorithm attempts to deliver multicast packets with little delay. It is based on the policy belief that as long as one traffic profile is satisfied among the multicast members, then the multicast should be transmitted without any additional buffering.

Min-Profile Algorithm

When Min-Profile Algorithm is employed, a selection decision based on the minimum profile among those traffic profiles that belong to a given multicast group. Generally, it is written as:

$$ONU_x \cap \min\{P_1, P_2, \ldots, P_N\};$$

where min is a function that finds the minimum value among its elements. Fortunately, this may be expressed in simplified form as:

$$ONU_x \cap \min\{CIR_1, CIR_2, \ldots, CIR_N\}$$

where the ONU with the minimum CIR value is selected as assignee.

This algorithm makes the least effort to deliver multicast packets at the expense of packet delay. It is based on the policy belief that multicast packets can be only delivered when all traffic profiles are satisfied simultaneously.

Mean-Profile Algorithm

When the mean-profile algorithm is employed, a selection decision is based upon the average of those traffic profiles that belong to a given multicast group. Generally, it is expressed as:

$$ONU_x \cap \text{mean}\{P_1, P_2, \ldots, P_N\}$$

where mean is a function that finds the average value among its elements. As before, this expression too may be written in simplified form as:

$$ONU_x \cap \text{mean}\{(\Sigma CIR_i)/N\}$$

When this algorithm is employed, $ONU_x$ is chosen to be that one having a CIR value closet to the mean value as calculated by the right-hand side of the above equation.

Random-Profile Algorithm

When the random-profile algorithm is employed, a selection decision is based upon a random number which corresponds to a traffic profile. Generally, the random-profile algorithm may be expressed as:

$$ONU_x \cap random\ \{N\};$$

which generates a random number in the set of N numbers. As can be appreciated, such an approach attempts to randomize the selection process.

Dynamic-Selection Algorithm

Each of the algorithms presented previously, may be considered as "static" in nature, since they all employ pre-defined traffic profiles. A dynamic selection algorithm, however, takes into account the past selection histories. For example, in one exemplary embodiment, a dynamic selection algorithm will track those ONUs that have been previously selected and preferably select an ONU that has been least selected. In this manner, an infrequently selected ONU will never be completely "locked out" of selection to provide the fairness among those ONUs that have subscribed to a particular multicast.

Dynamic Multicast Management

As can be readily appreciated by those skilled in the art, multicast systems are, by their very nature dynamic. For example, any subscriber of a multicast service may leave that service at any time. Likewise, for a given multicast service, requests to join the multicast group may be made at any time as well.

In each instance—joining or leaving a multicast group—the subscriber making the request specifies a particular multicast address to join or to leave. This particular multicast address thereafter called a requested multicast.

Figure 3:
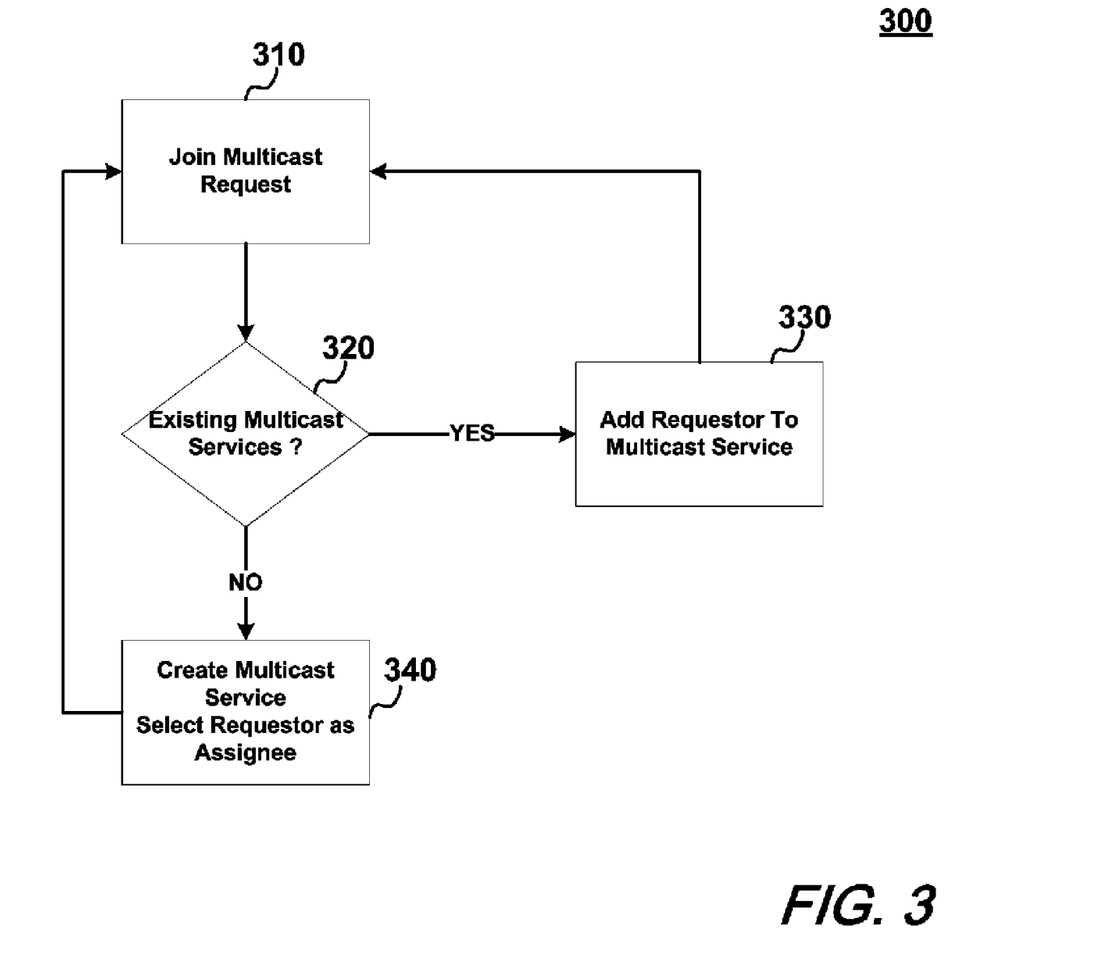
FIG. 3 is a flowchart depicting a join multicast request according to the present invention.

With reference now to FIG. 3, there is shown a flowchart depicting a process initiated when a subscriber requests to join a multicast group. More particularly, when a subscriber requests to join a multicast 310, the MMM (such as that depicted in FIG. 2*b*) will first determine whether the requested multicast is an existing multicast service or not (320).

If the requested multicast service already exists, then the requestor is simply added to the existing multicast membership list (330). This is possible because the assignee has already been chosen for that multicast.

Importantly, it is generally not desirable to change the assignee during the lifetime of a multicast service unless absolutely necessary because any change of assignee will change the queue to which multicast packets will be sent to. Such a change could lead to out-of-order delivery of packets received at ONUs, since two queues may have different packet queuing and transmission delays.

Continuing with our discussion of FIG. 3 and joining a multicast, if a requested multicast service does not exist (340), then the requester is made assignee for the multicast, since that requester is the first and only member of the multicast when the request is made.

Figure 4:
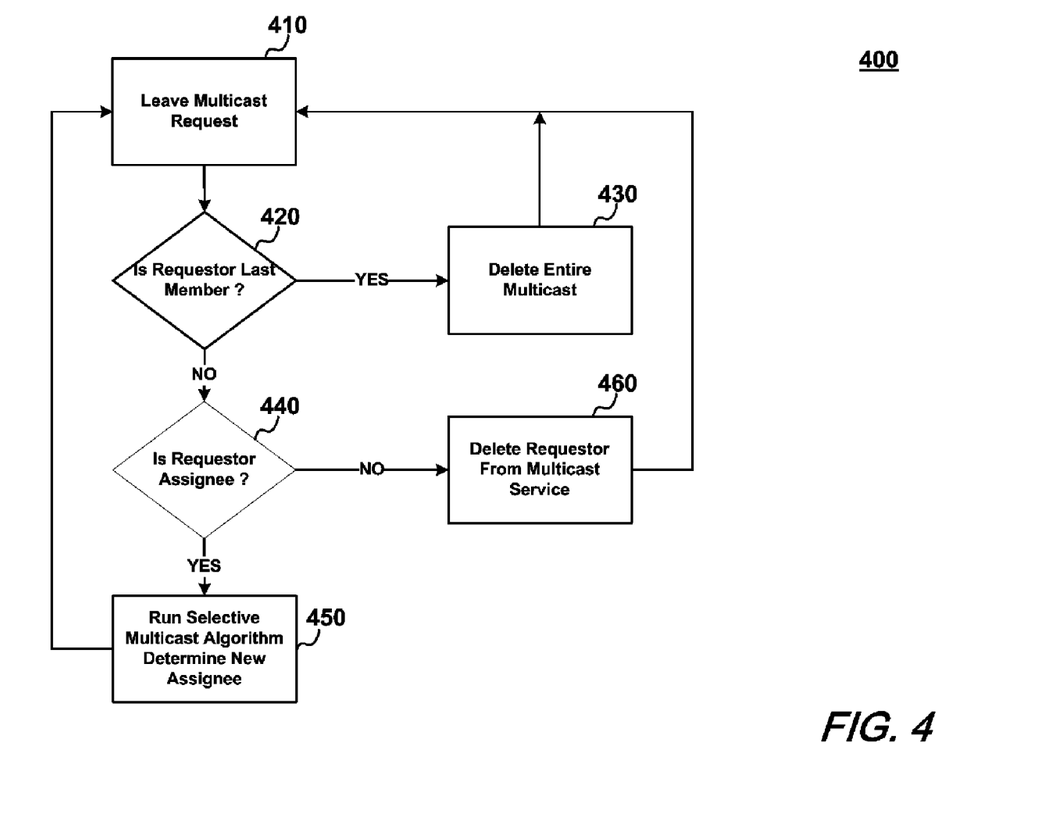
FIG. 4 is a flowchart depicting a leave multicast request according to the present invention.

Turning now to FIG. 4, there is shown a flowchart depicting the process involved when a subscriber leaves a multicast. More particularly, when a leave multicast request is received (410), the MMM will first determine whether or not the requester is the last member of the requested multicast (420). If the requester is the last member, the record containing the entire multicast membership is deleted (430).

If, on the other hand the requester is not the last member, it is determined whether or not the requester is the assignee for the requested multicast (440). If it is not, then the requester is deleted from the multicast service (460).

However, if the requester is the assignee for the requested multicast, it is necessary to change assignee. Consequently, the MMM runs a selective multicast algorithm as described previously to select a new assignee for the requested multicast (450).

As noted before, a change of assignees may potentially cause packets belonging to the multicast to be delivered out of order at ONUs. The severity of this problem depends upon how many packets are buffered in respective queues at the time when the leave request and subsequent assignee change is taking place.

Fortunately, there are two methods that may be employed which ease this problem, namely a "flush method" and a "draw-out" method. The flush method discards all packets in the previous queue prior to the assignee change. One disadvantage of this method however, is that it results in a temporary packet loss.

In contrast, the draw-out method temporarily buffers incoming multicast packets—if any—and does not change assignee until those multicast packets in the previous queue have completely been drawn out or served. Advantageously, this method reduces packet loss at the expense of additional packet delay.

Dedicated Multicast Queues

Figure 5:
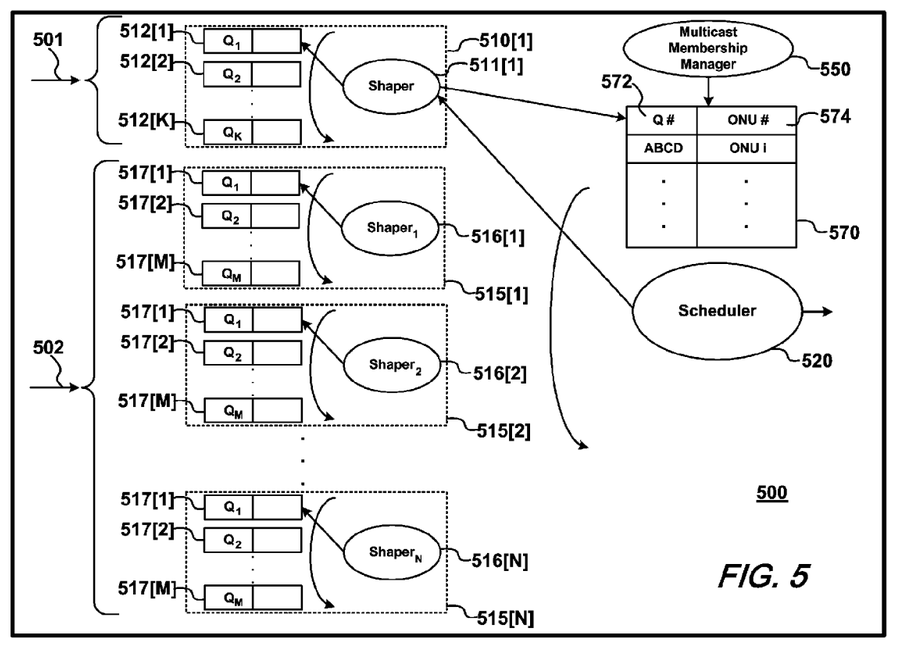
FIG. 5 is a block diagram depicting multicast and unicast queue management according to the present invention.

One way to avoid the packet delivery order problem is to have a separate multicast queue for each multicast address. Such a scheme is illustrated in FIG. 5.

With reference now to that FIG. 5, it can be seen that according to this scheme, multicast packets 501 are received by multicast queues 512[1] . . . 512[K] where they are subsequently serviced by multicast shaper 511[1]. In contrast, unicast packets 502 are received directly by an appropriate queue 517[1] . . . 517[M], wherein each queue belongs or is otherwise permanently associated with a particular destination ONU 515[1] . . . 515[N].

As can be readily appreciated, multicast shaper 511[1] may refer to a different ONU shaping process, depending upon the particular multicast queue 512[1] . . . 512[K] being served at a particular time. The relationship between the particular multicast queue index and ONU shaper index is determined by a selective multicast algorithm. More particularly, a shaper is dynamically linked to a unicast shaping process each time a multicast queue is served.

Operationally, the multicast shaper 511[1] populates and maintains a table 570 that identifies the relationship that exists between a multicast queue index 572 and ONU shaper index 574. The multicast membership manager 550, updates the table 570 as multicast membership changes. Since the multicast traffic is buffered in queues separate from unicast queues, its delivery order is guaranteed at the modest expense of implementing the dynamic multicast shaper.

What is claimed is:

1. A method of multicast traffic shaping of a point-to-multipoint network comprising:
   maintaining multicast membership information with addresses of multicast packets that are multicast addresses;
   receiving, by a transmitter, a multicast packet for transmitting to receivers of a multicast group with the receivers having independent predetermined traffic profiles;
   selecting a target shaper in the transmitter based on one of the traffic profiles associated with one more of the group of receivers;

wherein the traffic profile chosen is determined according to a methodology selected from the group consisting of: max-profile methodology; min-profile methodology; mean-profile methodology; random-profile methodology; and dynamic (history) based methodology; and transmitting the multicast packet from the transmitter with the target shaper delaying the multicast packet for receiving at the receivers according to the selected traffic profile.

2. The method as claimed in claim 1 wherein transmitting the multicast packet from the transmitter with the target shaper delaying the multicast packet includes delaying the multicast packet to conform to the traffic profiles selected for the target shaper.

3. The method as claimed in claim 1 further comprising tracking a previous selection of the target shaper for selecting the receivers that has been least selected.

4. The method as claimed in claim 1 further comprising:
   maintaining multicast membership information with an address of the multicast packet that is a multicast address; and
   wherein receiving, by the transmitter, the multicast packet for transmitting to the receivers of the multicast group includes:
   queuing the multicast packet based on the multicast address for associating the multicast packet to the receivers assigned to the multicast address.

5. The method as claimed in claim 1 further comprising:
   receiving a request for joining a multicast service not in existence in the multicast group from a receiver having a traffic profile; and
   wherein:
   selecting the target shaper in the transmitter includes selecting a traffic profile for the multicast service for selecting the receiver having the traffic profile, the receiver making the request.

6. The method as claimed in claim 1 further comprising:
   receiving a request for leaving the multicast group by one of the receivers that is the last member of the multicast group; and
   deleting the multicast group.

7. A point-to-multipoint network comprising:
   a multicast membership manager, having a multicast queue, for receiving a multicast packet for transmitting to receivers of a multicast group with the receivers having independent predetermined traffic profiles and
   a target shaper, coupled to the multicast membership manager, selected based on one of the traffic profiles associated with one more of the receivers and for transmitting the multicast packet from the transmitter with the target shaper delaying the multicast packet for receiving at the receivers; wherein the traffic profile chosen is determined according to a methodology selected from the group consisting of: max-profile methodology; min-profile methodology; mean-profile methodology; random-profile methodology; and dynamic (history) based methodology.

8. The network as claimed in claim 7 wherein the target shaper delays transmitting the multicast packet to conform to the traffic profiles selected for the target shaper.

9. The network as claimed in claim 7 wherein the multicast memory manager is for tracking a previous selection of the target shaper for selecting the receivers that has been least selected.

10. The network as claimed in claim 7 wherein:
    the multicast membership manager is for maintaining multicast membership information with an address of the multicast packet that is a multicast address; and
    further comprising:
    a queue for queuing the multicast packet based on the multicast address for associating the multicast packet to the receivers assigned to the multicast address.

11. The network as claimed in claim 7 wherein:
    the multicast membership manager is for receiving a request for joining a multicast service not in existence in the multicast group from a receiver having a traffic profile; and
    the target shaper is for selecting the receiver having the traffic profile for the multicast service, the receiver making the request.

12. The network as claimed in claim 7 wherein the multicast membership manager is for:
    receiving a request for leaving the multicast group by one of the receivers that is the last member of the multicast group; and
    deleting the multicast group.

* * * * *